United States Patent [19]
Andersson et al.

[11] Patent Number: 5,594,949
[45] Date of Patent: *Jan. 14, 1997

[54] MOBILE ASSISTED CHANNEL ALLOCATION

[75] Inventors: Claes H. Andersson, Stockholm; Hakan O. Eriksson, Vallentuna; Magnus E. Madfors, Sollentuna; Bengt Y. Persson, Djursholm, all of Sweden

[73] Assignee: Telefonaktiebolaget LM Ericsson, Stockholm, Sweden

[ * ] Notice: The term of this patent shall not extend beyond the expiration date of Pat. No. 5,375,123.

[21] Appl. No.: 356,634

[22] Filed: Dec. 15, 1994

Related U.S. Application Data

[63] Continuation of Ser. No. 14,222, Feb. 5, 1993, Pat. No. 5,375,123.

[51] Int. Cl.$^6$ .................................. H04B 17/00
[52] U.S. Cl. .................. 455/62; 455/67.1; 455/33.1; 455/54.2; 370/329
[58] Field of Search .................. 455/62, 67.1, 67.3, 455/33.1, 33.2, 54.2, 67.4, 63; 379/60, 58; 370/95.1

[56] References Cited

U.S. PATENT DOCUMENTS

| | | | |
|---|---|---|---|
| 4,608,711 | 8/1986 | Goldman | 455/33.2 |
| 4,696,027 | 9/1987 | Bonta | 379/60 |
| 4,723,303 | 2/1988 | Koch | 455/67.1 |
| 4,736,453 | 4/1988 | Schloemer | 455/33.2 |
| 4,765,753 | 8/1988 | Schmidt | 379/60 |
| 4,783,780 | 11/1988 | Alexis | 370/95.1 |
| 4,794,635 | 12/1988 | Hess | 379/60 |
| 4,811,380 | 3/1989 | Spear | 379/60 |
| 4,866,170 | 9/1989 | Schaeffer | 370/95.1 |
| 4,977,612 | 12/1990 | Wilson | 455/166.1 |
| 5,042,082 | 8/1991 | Dahlin | 455/33.1 |
| 5,050,166 | 9/1991 | Cantoni et al. | 370/94.1 |
| 5,093,924 | 3/1992 | Toshiyuki et al. | 455/67.3 |
| 5,179,722 | 1/1993 | Gunmar et al. | 455/33.1 |
| 5,212,684 | 5/1993 | MacNamee et al. | 370/24 |
| 5,220,562 | 6/1993 | Takada et al. | 370/85.13 |
| 5,239,676 | 8/1993 | Strawczynski et al. | 455/33.2 |
| 5,260,943 | 11/1993 | Comroe et al. | 370/95.1 |
| 5,375,123 | 12/1994 | Andersson et al. | 370/95.1 |

OTHER PUBLICATIONS

"Cellular System Dual–Mode Mobile Station—Base Station Compatibility Standard", *EIA/TIA Interim Standard*, IS–54–B, pp. 8, 248–249.

"Cellular System Dual–Mode Mobile Station—Base Station Compatibility Standard", *EIA/TIA Interim Standard*, IS–54–B, pp. 101–106; 109–116; 139–140; and 163–166 (Apr., 1992).

*Primary Examiner*—Andrew Faile
*Attorney, Agent, or Firm*—Burns, Doane, Swecker & Mathis, L.L.P.

[57] ABSTRACT

The present invention relates to systems and methods for allocating channels in a radiotelephone system wherein local estimation of interference for a potential new connection is achieved by measuring interference on the available downlink channels at a plurality of locations within a cell. The measurements can be made, for example, by already connected mobile stations, mobile stations which are not connected, fixed measurement stations or any combination thereof.

24 Claims, 3 Drawing Sheets

| SLOT 1 | SLOT 2 | SLOT 3 | SLOT 4 | SLOT 5 | SLOT 6 |

MOBILE ASSISTED CHANNEL ALLOCATION

This application is a continuation of application No. 08/014,222, filed Feb. 5, 1993, now U.S. Pat. No. 5,375,123.

BACKGROUND

The present invention relates generally to interference measurement in radiotelephone communication systems. More particularly, the present invention relates to estimation of interference on unused downlink channels prior to allocating a channel for a new call between a mobile station and a base station in a cellular telephone system.

The explosive growth in radio telecommunications requires continual improvement in the capacity of cellular systems. For example, one offshoot of this rapid growth is the gradual change internationally from analog cellular technology to digital cellular technology, which provides a five to ten fold increase in capacity. Improvements in technology alone, however, are insufficient to satisfy the rapid increase in demand. Thus, it is also necessary to improve the efficiency of existing cellular technology.

An important consideration in all radiocellular telephone systems is efficient use of the limited frequency spectrum allocated for cellular systems by the FCC. One method which has been adopted to maximize spectral efficiency is the frequency reuse scheme. In the frequency reuse scheme, the same channels can be simultaneously used to carry different calls in different areas, known as cells. One constraint on the frequency reuse scheme is that the cells must be spaced far enough apart that the interference between the two competing channels (called co-channel interference) is low enough to provide acceptable voice quality for users of the system. This interference characteristic conflicts with the desire to reuse the same channels as much as possible to maximize system capacity.

One measurement typically used to reflect signal quality in radiotelephone systems is the carrier-to-interference ratio (C/I). This ratio measures the strength of the carrier to the combined strength of any interfering signals. As discussed above, spectral efficiency, in the form of frequency reuse, pressures radiotelephone system designers to accept a relatively high level of co-channel interference to allow more frequency reuse.

Conventionally, a C/I of around 18 dB has been found to be an acceptable compromise between the competing goals of frequency efficiency and quality voice sound. Thus, many systems require that communication channels between a mobile and base station maintain a threshold C/I of about 18 dB. If the mobile unit either moves away from the base transmitter or moves to a location where interference is higher, such that the C/I drops below the threshold, the call will be handed off to another channel having sufficient quality.

In order to minimize handoffs which are required due to changes in quality within a cell, it is highly desirable to have knowledge of the interference on the channels available for communication before allocating any of these channels to a requesting mobile station.

One approach is to use a centralized decision system for channel assignment for each new call. For example, the received signal strength on control channels between each mobile station and each of a plurality of base stations in a cellular system can be monitored. The central processing system can correlate this information and make channel assignments dependent on the received signal strengths. One drawback to this centralized system is that it requires a great deal of measuring at the base stations as well as a lot of signalling between the base stations and the central system before a channel can be allocated.

This makes a decentralized approach much more feasible, i.e., a system wherein the allocation algorithm uses only data to which it has access without explicit reference to a multitude of other base stations. In its basic form the base station has access only to the signal strengths of the mobile station requesting a channel and to the interference in both up and down link on all channels that it can allocate.

However, time requirements on the call setup may not allow a solution where a mobile is ordered to measure the interference on down link channels during the call setup procedure. Additionally, some systems require that the base station transmit continuously on a carrier if the base station has a call on any of the time slots available on that carrier. In the latter systems it is not possible to measure the interference by using only a signal strength meter. In neither of these cases is it possible to anticipate the interference a particular mobile will receive prior to the allocation of a channel.

SUMMARY

The present invention overcomes these and other drawbacks of conventional systems and methods for allocating channels in radio telecommunications by providing a method and apparatus for locally estimating the interference on downlink channels available to a base station to determine candidate channels for new calls. Local estimation of interference can be achieved, for example, by using already connected mobile stations as measurement probes to measure the interference on downlink channels other than those channels already in use in the cell.

BRIEF DESCRIPTION OF THE DRAWINGS

These and other features of the present invention will become more apparent when reading the following detailed description in conjunction with the drawings, in which.

DETAILED DESCRIPTION OF THE PREFERRED EMBODIMENTS

Figure 1:
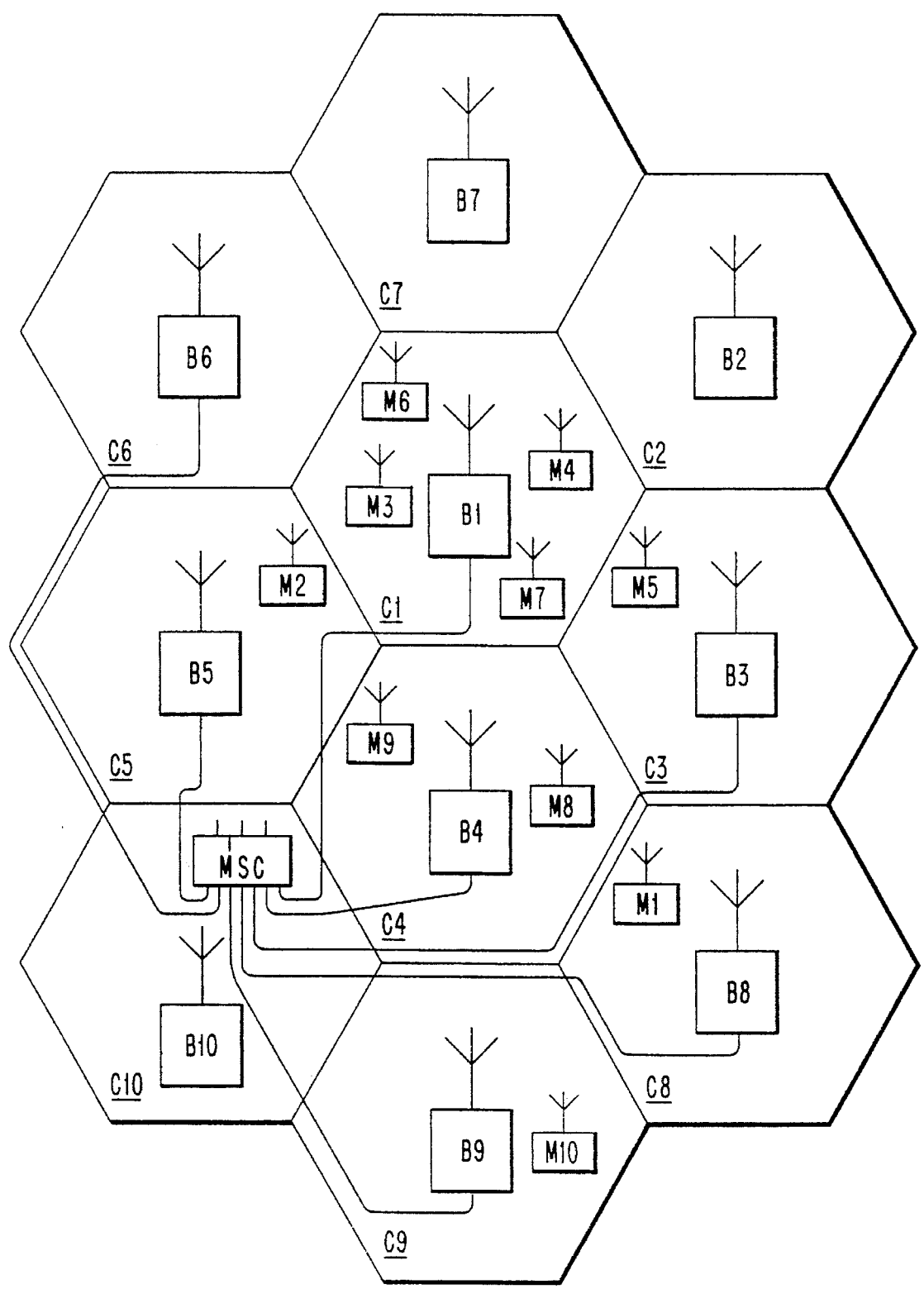
FIG. 1 illustrates an exemplary cellular system.

Prior to describing the details of the present invention, an example of the construction of a cellular mobile radio system in which the present invention can be used will be described. FIG. 1 is a schematic diagram illustrating ten cells, C1 to C10, in a cellular mobile radiotelephone system. Normally, methods and systems according to the present invention would be implemented in a cellular mobile radio system comprising many more cells than ten. For the purposes of this description, however, the system depicted in FIG. 1 is considered to be an isolated portion of a larger system which has been fragmented.

For each cell C1 to C10, there is a respective base station B1 to B10. The exemplary embodiment illustrated in FIG. 1 shows base stations situated in the vicinity of the respective cell centers and having omni-directional antennas. Those skilled in the art will readily appreciate that the base stations may be located in other areas of the cells and have other types of antennas, for example, in the vicinity of cell borders and having directional antennas.

FIG. 1 also illustrates ten mobile stations M1 to M10, which are movable within a cell and from one cell to another cell. Again, methods and systems according to the present invention can be practiced with more or less than ten mobile stations.

Also illustrated in FIG. 1 is a mobile switching center MSC. The mobile switching center is connected to all ten base stations by cables (not all shown) and to a fixed public switching telephone network or similar fixed network. The mobile switching center routes calls to and from the base stations and coordinates the activities of the system.

Cellular systems are assigned a particular frequency band over which they can operate. This frequency band is allocated in units called channels to the cells in a particular area. As discussed above, the efficient use of the frequency spectrum is an important consideration in maximizing system capacity. Thus, it is not surprising that a number of different methodologies have been adopted for allocating channels to the various cells and, more particularly, to assigning a channel for new connections occurring within each cell. Some of these methodologies allocate fixed sets of channels to each cell, while others allocate channels dynamically based on traffic densities and/or interference situations.

Figures 2, 3:
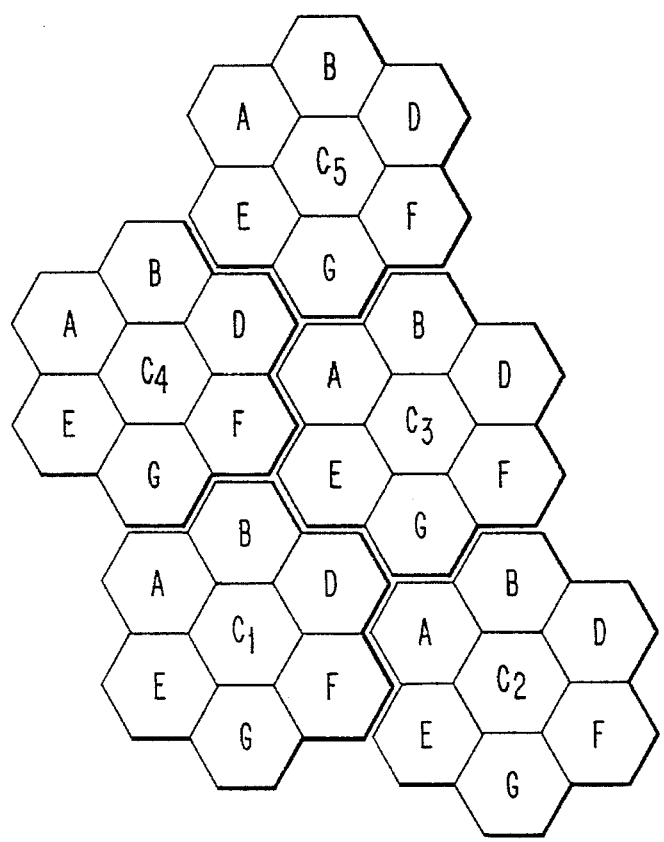
FIG. 2 illustrates an exemplary frequency reuse scheme.
FIG. 3 shows an exemplary frame format comprising a plurality of time slots.

FIG. 2 illustrates an exemplary 7-cell frequency reuse pattern wherein frequency channel sets A–G are reused in a symmetric pattern. Of course those skilled in the art will readily appreciate that frequency reuse clusters of many different types such as 3-cell, 4-cell, 9-cell, 12-cell, and 21-cell are known and that the present invention can be implemented using any type of reuse pattern. Since the distance between cells having the same channel sets (co-channel interferers) is much larger than the distance between a base station and a mobile station connected to that base station within any given cell, the distance-related transmission losses to the interferers can be considered to be constant and only lognormal fading need be considered. If the number of interferers of significant magnitude (e.g., connected mobiles in cells $C_2$, $C_3$, and $C_4$ using the same channel as a mobile in cell $C_1$) is greater than one, then there will be an even smaller variation (in dB) in interference in the area covered by the cell. This characteristic of co-channel interference allows a fairly good estimate of the potential interference on different channels in the cell to be obtained by taking measurements of the channels not currently in use by mobile stations already connected to the base station.

Thus, according to exemplary embodiments of the present invention, when a new connection is to be established with a mobile station, the base station signals those mobile stations already connected to make interference measurements of those downlink channels not currently in use. For example, if a new connection is to be established with mobile M3 in cell C1, the base station B1 would send signals to any of mobile stations M4, M6, and M7 which are already connected thereto. Alternately, the base station could periodically command mobile stations connected thereto to make measurements of unused channels and subsequently use that information when a mobile station requests a channel.

Those mobile stations would measure the interference on the downlink channels available in the cell. The results of these measurements are then transmitted to the base station and can then be used to estimate the interference which a new connection will have in the downlink. Since the base station can measure the received signal strength of a mobile station on the control channel, it is easy to estimate the signal strength which the mobile station will receive from the base. Then the carrier-to-interference ratio can easily be estimated.

The base station can signal the already connected mobile stations to perform the above-described measurements in different ways. According to one exemplary embodiment of the present invention, the base station signals the already connected mobile stations to perform measurements of the downlink channels not in use by invoking the mobile-assisted handoff (MAHO) function. The MAHO function is conventionally used to request an already connected mobile station, which is in need of a handoff, to measure the signal strength from other potential base stations to which the call can be handed off. When the MAHO function is invoked by the base station, the mobile station will measure the received signal strength (RSSI) of the channels/frequencies identified by the base station in a measurement order. Information relating to the RSSI of the identified channels is then sent back to the base station, which uses the information to determine which base station the call should be handed off to.

When used according to this exemplary embodiment of the present invention, however, the MAHO function is invoked at mobile stations other than the one which is requesting a new connection. The interference information is then transmitted back to the base station which uses the information from each connected mobile station to calculate, on each candidate channel, a typical or average interference (e.g., mean or weighted average) which the mobile desiring a connection could expect to receive. As mentioned above, the carrier-to-interference ratio is readily determined by using this typical interference value and the base station calculating the carrier strength which the mobile station will receive based on the received signal strength of signals from the mobile station requesting a channel, the power used by this mobile station and the transmission power to be used by the base station.

In some time division multiple access (TDMA) systems, such as the American Digital Cellular (ADC) system (as described by the TIA standard IS-54), a base station which is transmitting a call on one channel of a carrier is required to continuously transmit on that carrier, even if some of the time slots are not being used. In such a system, the interference experienced by a mobile station on the downlink channel will be the same on all channels sharing a carrier.

Thus, in such systems a measurement value of the downlink interference on any of the channels sharing a frequency is valid for all these channels. In, for example, the ADC system, a base station can order a mobile station to measure on up to 12 different frequencies by invoking the MAHO function and identifying the frequencies as discussed above. However, it is preferred that only some of the maximum number of measurable frequencies be identified in this manner, because the mobile station acting as a measurement probe may itself require a handoff while performing these measurements.

In the above described system (e.g., ADC) a signal strength measurement can not be used to determine the interference on channels having a frequency on which the base is transmitting. This is because the base station itself would be the major contributor to any received signal strength. In these cases the measurements could be based on the bit error rate of known words (such as sync words) which the base station transmits. A signal indicating channel quality based on the bit error rate is then transmitted back to the base station. An average or weighted interference value can be determined based on a known functional relationship between the measured BER and the C/I for the particular type of mobile station which performed the measurement. These known functions can be predetermined based on simulations or actual tests of the various types of mobile stations. If there are no words transmitted by the base station that are known by the mobile station or if the known information is insufficient to get a significant measurement, the BER can be calculated using the number of different bits between a corrected word and an uncorrected word divided by the total number of bits in the word.

According to the foregoing exemplary embodiments, the typical or average interference of the downlink channels are used in determining an optimal channel for a new connection and the transmission loss, or the received carrier in the reporting mobiles, is not regarded. If, however, there is a large correlation between the transmission losses to the mobile stations and the interference on different channels, the typical interference reported by the already connected mobiles could be stored at the base station according to the transmission loss.

For example, the interference information reported by the already connected mobile stations could be stored relative to the transmission loss of the reporting mobile in the loss range of between 50 to 100 dB in intervals of 5 dB. Then, when a mobile station requests a new connection, the base station could determine an average interference value based on the reported interference information of mobile stations having transmission losses in the same interval as the requesting mobile station.

Thus, if such a correlation between interference and transmission loss exists, mobiles having, for example, a small transmission loss (i.e., mobiles close to the base) should report interference information with smaller relative deviations. This characteristic can be used to lower the safety margin when using the estimated interference for allocating a channel for a new call. Thus, in systems employing selection criteria for a communication channel other than the highest C/I value, lowering the safety margin could permit selection of channels which would otherwise be deemed unacceptable.

The present invention has been discussed generally with respect to radiotelephone communication systems having mobile and base stations, but without a detailed discussion of the various components which can comprise either of the base or mobile stations. Such a discussion is considered to be unnecessary as the present invention is applicable to any type of radiotelephone communication system and, therefore, to any type of mobile and base stations wherein already connected mobile stations can measure the quality of downlink channels and send information relating to such a measurement back to the base station. For the purposes of reference and background material, a detailed description of an exemplary mobile and base stations can be found in U.S. Pat. No. 5,042,082, issued on Aug. 20, 1991 and entitled "Mobile Assisted Handoff", and U.S. Pat. No. 5,140,627 issued Aug. 18, 1992 and entitled "Handoff Procedure That Minimizes Disturbances to DTMF Signalling in a Cellular Radio System" which are hereby incorporated by reference.

Figure 4:
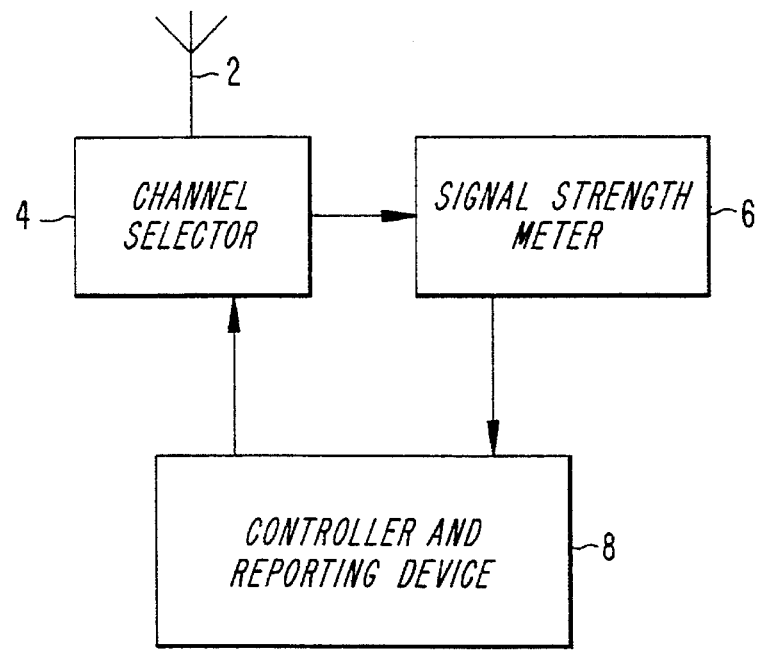
FIG. 4 is a block diagram of a measurement station according to one exemplary embodiment of the present invention.
Figure 5:
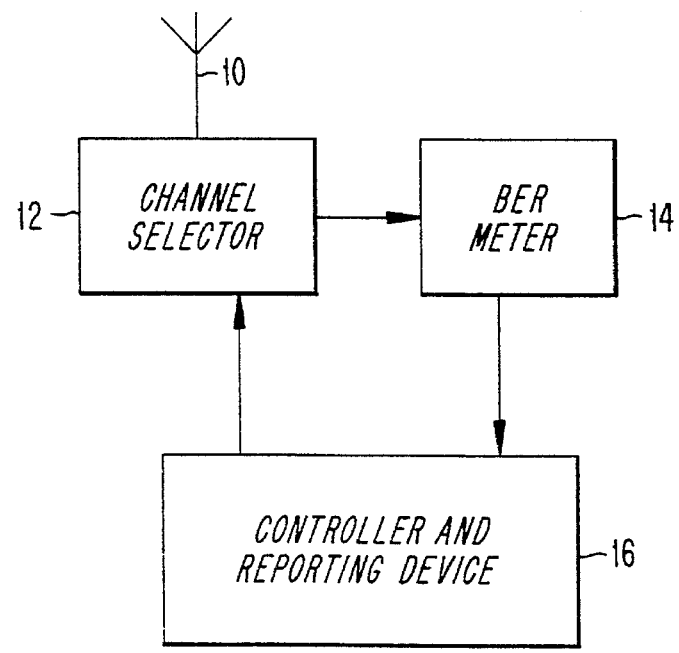
FIG. 5 is a block diagram of a measurement station according to a different exemplary embodiment.

Moreover, the present invention is not limited in application to systems wherein already connected mobile stations perform the measurements of the downlink channels. Exemplary measurement stations are illustrated in FIGS. 4 and 5. In FIG. 4, a channel is selected for measurement by channel selector 4 and received over antenna 2. The signal strength of the channel is measured by the RSSI meter 6 which outputs the result to controller 8. The controller 8 can then report signal strength information to a base station either periodically or upon request from the base station. The exemplary measurement station shown in FIG. 5 operates in a similar manner, having antenna 10, channel selector 12 and controller 16. However, instead of gauging signal quality by measuring signal strength, this exemplary measurement station measures the bit error rate (BER) of the received signal in meter 14.

Measurement stations can be provided in each cell which periodically, or on request, measure all of the downlink channels and report information relating to the interference relating thereto to the base station. Such measurement stations can be provided, for example, in systems wherein the base station cannot command mobile stations to make such quality related measurements or wherein such resources must be reserved for mobile assisted handoffs. Thus, in systems according to this exemplary embodiment, mobile stations need not be provided with MAHO capability.

An alternate exemplary embodiment of the present invention provides a slightly different approach to using mobile stations as measurement probes to give base stations information pertaining to the signal quality of available channels. In this exemplary embodiment, idle mobile stations, as opposed to mobile stations which are already connected as in the foregoing exemplary embodiments, are instructed to measure either or both of the word error rate or received signal strength on channels designated by the base station. The base instructs these idle mobile stations to perform such measurements via transmission overhead signalling to all of the mobile stations, e.g., the broadcast control channel (BCCH).

For example, the system can send a list of up to eight frequencies on the BCCH which all idle mobile stations shall measure the signal strength of and report to the base station. The number of frequencies to be measured can be variable, as can the selection of method for determining signal quality. The mobile stations can be instructed by the system to measure each listed frequency a predetermined number of times, e.g., 4 times, with a predetermined spacing between measurements, e.g., 20 ms. A resultant average of either signal strength or error rate can then be calculated and returned to the base station.

As another example, the idle mobile station can be instructed by the system to measure the quality of the serving digital control channel (DCC), i.e., the control channel that the idle mobile station is locked and listening to, by performing a running average over a last predetermined number, e.g., 32, of readings of its associated paging channel (PCH) for both signal quality, e.g., word error rate, and signal strength, e.g., RSS. The mobile station can be instructed to perform either or both of the above described measurements continuously or just before the idle mobile station accesses the system.

The system can also instruct the idle mobile stations regarding when reports should be sent informing the system of the measurement results and what information these reports should contain. For example, the idle mobile station(s) can be instructed to inform the system of the measurement results when they make a predetermined type of access to the system, e.g., a registration access and/or an origination access. In such reports, the mobile station can be instructed to include information pertaining to, for example, one or more of: what type of measurements were made (i.e., the DCC or other channels or both), whether the report is based on a full measurement interval and the measurement results themselves.

It will be appreciated by those skilled in the art that the present invention can be embodied in other specific forms without departing from the spirit or essential character thereof. The presently disclosed exemplary embodiments are therefore considered to be illustrative in all respects and not restrictive. For example, although some of the exemplary embodiments have been discussed in terms of mobile stations (e.g., vehicle-mounted units), those skilled in the art will understand that the present invention is equally applicable to portable stations (e.g., briefcase or handcarried units) or any other type of remote radio communication devices. The scope of the invention is indicated by the appended claims rather than the foregoing description, and all equivalents thereof are intended to be embraced thereby.

We claim:

1. A signalling method in a radiocommunication system for reporting measurements associated with downlink channels available to a base station in which the measurements can be used to allocate channels for new calls in a cell serviced by the base station by using a plurality of idle mobile stations within the cell as measurement probes to procure the measurements comprising the steps of:

broadcasting a single message from a base station on a control channel to a plurality of idle mobile stations instructing each of said idle mobile stations to perform said measurements; and including, as part of said message, a list of frequencies on which each of said plurality of idle mobile stations are to perform said measurements.

2. The signalling method of claim 1, wherein said measurements include signal strength measurements.

3. The signalling method of claim 1, wherein said measurements include word error rate measurements.

4. A measurement method in a radiocommunication system comprising the steps of:

broadcasting a single message on a control channel instructing a plurality of idle mobile stations to measure on at least one frequency;

receiving the message at the idle mobile stations;

measuring, at said plurality of idle mobile stations, on said at least one frequency; and reporting, to said radiocommunication system, each of the results of said idle mobile stations' measurements.

5. The measurement method of claim 4, wherein said idle mobile stations' measurements include a signal strength measurement.

6. The measurement method of claim 4, wherein said idle mobile stations' measurements include a word error rate measurement.

7. The measurement method of claim 4, wherein said step of measuring further comprises the steps of:

taking a plurality of measurements on said at least one frequency; and averaging said plurality of measurements for each of said at least one frequency.

8. The measurement method of claim 7, wherein said step of reporting includes reporting said average measurement.

9. The measurement method of claim 7 wherein said plurality of measurements is four.

10. The measurement method of claim 7 wherein said plurality of measurements are taken at time intervals of 20 ms.

11. A signalling method in a radiocommunication system for reporting measurements associated with downlink channels available to a base station in which the measurements can be used to allocate channels for new calls in a cell serviced by the base station by using a plurality of idle mobile stations within the cell as measurement probes to procure the measurements comprising the step of:

broadcasting a single message from a base station on a control channel instructing each idle mobile station to measure a serving digital control channel to which that mobile station is listening.

12. A measurement method in a radiocommunication system for reporting measurements associated with downlink channels available to a base station in which the measurements can be used to allocate channels for new calls in a cell serviced by the base station by using a plurality of idle mobile stations within the cell as measurement probes to procure the measurements comprising the steps of:

receiving a broadcast message on a control channel instructing an idle mobile station to measure a serving digital control channel to which said idle mobile station is locked;

measuring a characteristic of said serving digital control channel; and reporting said measured characteristic to said radiocommunication system.

13. The measurement method of claim 12, wherein said characteristic is signal strength.

14. The measurement method of claim 12, wherein said characteristic is word error rate.

15. The measurement of claim 12 further comprising the steps of:

measuring said characteristic of said serving digital control channel a plurality of times;

averaging said plural measurements of said characteristic to obtain an averaged measured characteristic; and reporting said averaged measured characteristic to said system.

16. The measurement method of claim 15, wherein said plurality of times is 32.

17. A signalling method between a mobile station and a fixed part of a radiocommunication system comprising the steps of:

performing, by said mobile station, one of a plurality of types of measurements;

transmitting, in a report from said mobile station to said fixed part of said radiocommunication system, an indication of said type of measurement performed by said mobile station;

transmitting, in said report from said mobile station to said fixed part of said radiocommunication system, an indication as to whether said measurement is based upon a full measurement interval; and transmitting to said radiocommunication system said measurement.

18. A signalling method in a radiocommunication system for reporting measurements associated with downlink channels available to a base station in which the measurements can be used to allocate channels for new calls in a cell serviced by the base station by using a plurality of idle mobile stations within the cell as measurement probes to procure the measurements comprising the step of transmitting from a fixed part of said radiocommunication system a message indicating a measurement to be performed by an idle mobile station and a type of access at which time a measurement value is to be reported by the idle mobile station.

19. The signalling method of claim 18, wherein the type of access is a registration access.

20. The signalling method of claim 18, wherein the type of access is an origination access.

21. A signalling method in a radiocommunication system for reporting measurements associated with downlink channels available to a base station in which the measurements can be used to allocate channels for new calls in a cell serviced by the base station by using a plurality of idle mobile stations within the cell as measurement probes to procure the measurements comprising the steps of:

receiving a message from a fixed part of said radiocommunication system in an idle mobile station;

performing a measurement by the idle mobile responsive to said message; and transmitting a measurement value from the mobile station at a time corresponding to a type of access specified in the message.

22. The signalling method of claim 21, wherein the type of access is a registration access.

23. The signalling method of claim 21, wherein the type of access is an origination access.

24. A measurement method in a radiocommunication system comprising the steps of:

receiving a message on a broadcast control channel instructing a mobile station to measure a serving digital control channel to which said mobile station is locked;

measuring a characteristic of said serving digital control channel plurality of times;

reporting said measured characteristic to said radiocommunication system;

averaging said measured characteristic;

reporting said averaged measured characteristic to said system;

determining if said plurality of times is equal to a full measurement interval; and providing an indication to said system of whether said averaged measured characteristic was taken over said full measurement interval.

\* \* \* \* \*